United States Patent
Miloser et al.

(10) Patent No.: US 10,259,469 B2
(45) Date of Patent: Apr. 16, 2019

(54) METHODS AND APPARATUS TO SELECTIVELY DISABLE FUNCTIONS OF ELECTRONIC CONTROL UNITS

(71) Applicant: Ford Global Technologies, LLC, Dearborn, MI (US)

(72) Inventors: James Andrew Miloser, Saline, MI (US); Steve Michael Cunningham, Ann Arbor, MI (US); Chris Acosta, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 15/176,850

(22) Filed: Jun. 8, 2016

(65) Prior Publication Data
US 2017/0355381 A1    Dec. 14, 2017

(51) Int. Cl.
| | | |
|---|---|---|
| *B60W 50/04* | (2006.01) | |
| *G07C 5/08* | (2006.01) | |
| *G07C 5/00* | (2006.01) | |
| *G06F 11/00* | (2006.01) | |
| *G06F 8/65* | (2018.01) | |

(52) U.S. Cl.
CPC .............. *B60W 50/04* (2013.01); *G06F 8/65* (2013.01); *G07C 5/008* (2013.01); *G07C 5/085* (2013.01); *G06F 11/00* (2013.01)

(58) Field of Classification Search
None
See application file for complete search history.

(56) References Cited

U.S. PATENT DOCUMENTS

| | | | |
|---|---|---|---|
| 6,505,105 B2 | 1/2003 | Allen et al. | |
| 7,467,035 B2 | 12/2008 | Sayce-Jones | |
| 8,560,823 B1 * | 10/2013 | Aytek | G06F 8/654 |
| | | | 713/2 |
| 9,079,494 B2 | 7/2015 | Skelton | |
| 2011/0320089 A1 * | 12/2011 | Lewis | G01C 21/32 |
| | | | 701/29.6 |
| 2014/0137091 A1 | 5/2014 | Kim | |
| 2014/0351460 A1 * | 11/2014 | Tsuboi | G06F 8/60 |
| | | | 710/36 |
| 2015/0057894 A1 | 2/2015 | Jung et al. | |
| 2016/0266886 A1 * | 9/2016 | Sarkar | G06F 8/65 |
| 2017/0123779 A1 * | 5/2017 | Albot | G06F 12/109 |

FOREIGN PATENT DOCUMENTS

WO    2015176098 A1    11/2015

* cited by examiner

*Primary Examiner* — Lail A Kleinman
(74) *Attorney, Agent, or Firm* — Brandon Hicks; Hanley, Flight & Zimmerman, LLC (57) ABSTRACT

Methods and apparatus to selectively disable functions in electronic control units are disclosed. An example method includes executing, via a processor of an electronic control unit in a vehicle, a first software function and a second software function. The method further includes preventing the execution of the first software function while continuing to execute the second software function.

18 Claims, 5 Drawing Sheets

FIG. 6

METHODS AND APPARATUS TO SELECTIVELY DISABLE FUNCTIONS OF ELECTRONIC CONTROL UNITS

FIELD OF THE DISCLOSURE

This disclosure relates generally to electronic control units and, more particularly, to methods and apparatus to selectively disable functions of electronic control units.

BACKGROUND

Many motor vehicles include a number of electronic control units (ECUs), sometimes referred to as embedded control units, that execute one or more software functions to control different electrical systems and/or subsystems within the vehicle. Types of ECUs include an engine control unit, a powertrain control unit, a brake control unit, a door control unit, etc.

SUMMARY

Methods and apparatus to selectively disable functions of electronic control units are disclosed. An example method includes executing, via a processor of an electronic control unit in a vehicle, a first software function and a second software function. The method further includes preventing the execution of the first software function while continuing to execute the second software function.

An example electronic control unit in a vehicle includes a processor and a memory including instructions that, when executed, cause the processor to execute a first software function of the electronic control unit of the vehicle and execute a second software function of the electronic control unit. The instructions further cause the processor to disable the first software function to prevent the execution of the first software function while continuing to execute the second software function.

In another example, a tangible computer readable storage medium includes example instructions that, when executed, cause a machine to at least execute a first software function of an electronic control unit in a vehicle and execute a second software function of the electronic control unit. The example instructions also cause the machine to disable the first software function while continuing to execute the second software function.

DETAILED DESCRIPTION

Typically, ECUs are built by tier one suppliers for installation into a vehicle by an original equipment manufacturer (OEM). Thus, the configuration, design, and/or modification of ECUs are often limited to functionality agreed upon between the OEM and the tier one supplier prior to the fabrication of the ECU. As a result, when an OEM desires an ECU that includes different logic providing new and/or different functionality from an existing ECU, it is often necessary to engage a tier one supplier to re-build or re-design the entire ECU system. This process can be expensive and involves long lead times. As a result, before a tier one supplier can be contracted to develop a new design for an ECU, OEMs may desire to test and/or prototype potential features or functions and/or the mechanisms of their implementation. However, testing isolated features and/or functionalities of an ECU can be difficult because most ECUs are designed and developed as a unitary whole. That is, to invoke a particular functionality of an ECU typically results in the invocation of other functionalities of the ECU. The execution of functionalities in an ECU other than a particular functionality of interest can create problems of undesirable and/or unintended effects during a testing procedure for the particular functionality.

The problems arising from testing a specific feature or functionality of an ECU are further exacerbated by the fact the ECU may have an interdependent relationship with one or more other ECUs in a vehicle. That is, in many vehicles, multiple ECUs are implemented in a distributed system in which the features or functionalities of one ECU depend upon the implementation of features or functionalities of other ECUs. As a result, testing a new and/or altered design of a particular functionality of one ECU may affect the operation of other ECUs and/or depend upon the operation of other ECUs. Where each ECU operates as a unitary whole, the operation of the other ECUs may involve the execution of other functionalities of such ECUs that are not relevant to the particular function of interest to be tested and which may be disruptive to the testing of the particular function and/or otherwise undesirable during testing.

As a specific example, an OEM for a vehicle may desire to test the functionality provided by a telecommunications ECU that initiates an emergency 9-1-1 call to report the vehicle has had a front end collision. To test this telecommunications ECU, it may be necessary to execute functionality in the vehicle's safety system ECU that detects a front end collision. However, in some instances, the safety system ECU is designed to control all of the active safety features in a vehicle. Thus, in addition to detecting a front end collision (thereby triggering the 9-1-1 call by the telecommunications ECU), the safety system ECU may have other functionalities including, for example, popping the air bags of the vehicle when a front end collision is detected. Thus, data generated by the safety system ECU needed to test the emergency call feature of the telecommunications ECU (i.e., data indicating a front end collision) may be the same data that also triggers the air bags. However, popping the air bags is not relevant to testing the telecommunications ECU and, therefore, is an undesirable effect of the test procedure.

As described above, ECUs are typically designed as unitary wholes with all of the features or functions implemented on the ECU being in operation when the ECU is in use. Accordingly, to perform the test on the telecommunications ECU in the example outlined above without deploying the air bags, OEMs may attempt to replace the entire safety system ECU with a set of software applications that mimic all of the features and/or functions of the safety system ECU except for triggering the air bags. Typically, the replacement software applications are implemented on a computer (e.g., a laptop) or other diagnostic tool that is communicatively coupled with a controller network in the vehicle (e.g., via an onboard diagnostic (OBD) connector) to interface with the telecommunications ECU and/or other ECUs on the network. Furthermore, to ensure that the actual safety system ECU does not disrupt the test procedures, the OEM may physically disconnect the ECU from the network, which often includes the physical removal of the ECU from the vehicle. Thus, not only does this process require the development of the full set of software functions to mimic the safety system ECU but it also involves physical modifications to the vehicle. An alternative solution that would prevent the air bags from deploying in the above example without removing the safety system ECU is to remove the air bag assembly. However, this again involves a burdensome modification to the vehicle before the test procedure can be performed.

The examples disclosed herein overcome the above challenges by enabling particular software functions implemented on an ECU to be suppressed, deactivated, or disabled and replaced by software logic being executed on an external device while still allowing other functions of the ECU to be executed internally. As used herein, to suppress, deactivate, or disable a software function means that the software function is prevented from being executed. In some examples, the external device executing the replacement logic software may be a different ECU within the vehicle or a device separate from the vehicle that interfaces with the ECU having the function to be replaced via a wired or wireless connection.

Figure 1:
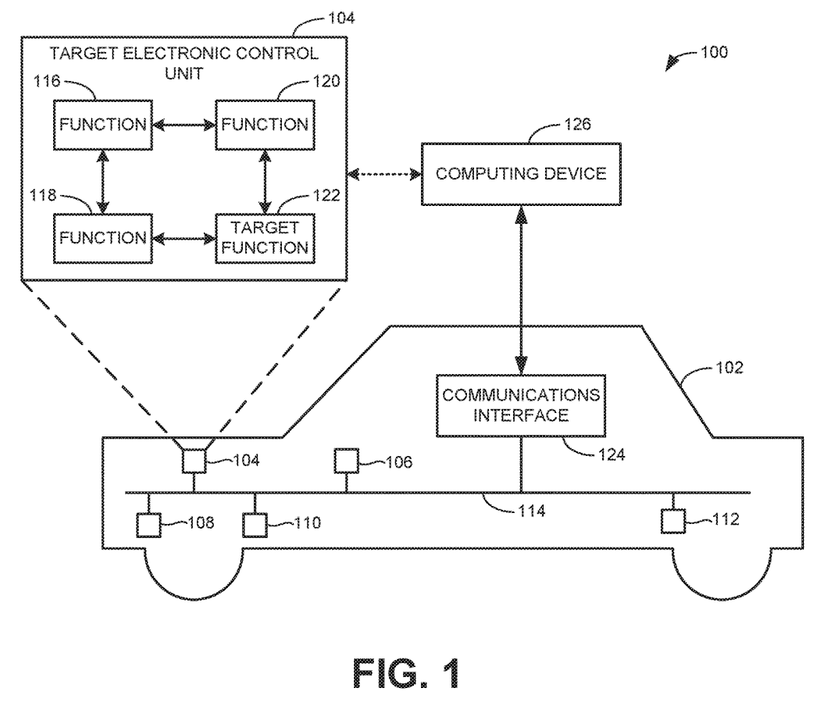
FIG. 1 illustrates an example system within which the teachings disclosed herein may be implemented.

FIG. 1 illustrates an example system 100 within which the teachings disclosed herein may be implemented. In the illustrated example, a vehicle 102 is provided with a number of ECUs 104, 106, 108, 110, 112 that may interface with one another over a bus and/or network 114. The network 114 may be implemented using any suitable communication medium and protocol. For example, the network 114 may be implemented based on the Controller Area Network (CAN) bus standard. Although five ECUs are shown communicatively interconnected via a single network, the vehicle 102 may have any number of ECUs interconnected via one or more networks.

As shown in the expanded view of the first ECU 104, each of the ECUs 104, 106, 108, 110, 112 includes one or more software functions 116, 118, 120, 122. As used herein, a software function (or simply function) refers to a discrete block of software logic that may be executed by a processor or microcontroller of an ECU to implement a particular functionality and/or a set of related functionalities. The different software functions executed by the ECUs 104, 106, 108, 110, 112 serve to control different electrical systems and/or subsystems within the vehicle including, for example, the engine, the powertrain, the brakes, the doors, the windows, the seats, the navigation system, a human-machine interface, etc. In the illustrated example, the first ECU 104 is labelled as a target ECU because one of the functions in the target ECU 104 is a target function (e.g., the function 122) to be deactivated as described more fully below. Thus, while the target ECU 104 is designated as a target ECU for purposes of explanation, any one of the ECUs 104, 106, 108, 110, 112 may include one or more particular functions that a person desires to deactivate or disable in accordance with the teachings disclosed herein.

The individual functions 116, 118, 120, 122 executed by the target ECU 104 may interface with one another using a common application programming interface (API). Further, in some examples, the functions 116, 118, 120, 122 executed by the target ECU 104 may also interface with other functions executed on other ECUs using the same API via messages or interface calls transmitted between the ECUs 104, 106, 108, 110, 112 via the network 114. That is, in some examples, sensor values collected (and/or the resulting data generated from an analysis of such data) by a particular function of a particular ECU may be used by another ECU to perform additional calculations and/or to implement additional control sequences.

As shown in the illustrated example, the vehicle 102 is provided with communications interface 124 to enable a computing device 126 separate from the vehicle 102 to interface with any of the ECUs 104, 106, 108, 110, 112 via the network 114. In some examples, the computing device 126 may be physically connected (e.g., hard wired) to be communicatively coupled with the network 114. In some examples, the communications interface 124 may be implemented by a particular ECU. In some examples, the communications interface 124 may be a standard onboard diagnostic II (OBD-II) connector used in many vehicles or any other type of physical interface to implement any suitable communications protocol (e.g., CAN, Ethernet, FlexRay, Fiber, LIN (Local Interconnect Network), etc.). In such examples, the computing device 126 may be any type of computing device (e.g., a laptop, smartphone, handheld diagnostic tool, etc.) that physically interfaces with the communications interface 124 either directly or indirectly. Once connected to the network 114, the computing device 126 may interface with the ECUs 104, 106, 108, 110, 112. More particularly, in some examples, the computing device 126 executes software functions that interface with the functions executed on the ECUs using the same API described above. Thus, as represented by the dashed arrow between the computing device 126 and the expanded view of the first ECU 104, the computing device 126 may interface with the other ECUs in the same manner as separate ECUs interface with each other.

Additionally or alternatively, in some examples, the communications interface 124 may be a wireless communications interface to enable the computing device 126 to be communicatively coupled to the network 114 to interface with the ECUs 104, 106, 108, 110, 112 via a wireless connection. In some examples, the communications interface 124 as a wireless interface may be implemented by a particular ECU. In some examples, the communications interface 124 as a wireless interface may be separate from the vehicle 102 but communicatively coupled thereto via the OBD-II connector and/or any other physical connection as discussed above. In some examples, the computing device 126 may communicate directly with the communications interface 124 via short range wireless (e.g., Bluetooth) technology. In other examples, the computing device 126 may communicate indirectly with the communications interface 124 as a wireless interface over a wireless network (e.g., a mobile cellular network) and/or over the Internet. Thus, while the computing device 126 may be in the vicinity of the vehicle 102, in some examples, the computing device 126 may be remote from the vehicle 102.

As mentioned above, one of the software functions 116, 118, 120, 122 of the target ECU 104 is labelled as a target function 122 in FIG. 1. The target function 122 is representative of a feature or function of the target ECU 104 that a person desires to deactivate or disable. In some instances, a person may desire to disable (i.e., prevent the execution of) the target function 122 because the functionality provided by the target function 122 is to be replaced by different functionality implemented on a different ECU and/or on the computing device 126. In some examples, the person may desire to replace the functionality of the target function 122 permanently (e.g., by an end user of the vehicle or other third party desiring to modify and/or enhance the performance and/or other features of the vehicle). In other examples, the person may desire to replace the functionality temporarily (e.g., an OEM desiring to test a new software function with different logic).

Additionally or alternatively, in some instances, people may desire to disable or deactivate the target function 122 without actually replacing it to permanently or temporarily prevent the operation of the target function 122. For example, an OEM may desire to test a different (new or modified) software function (e.g., in the same or different ECU) unrelated to the particular functionality of the target function 122 but under circumstances that would trigger execution of the target function 122. For instance, using the example described above, the target function 122 may correspond to functionality triggering deployment of an air bag in response to a message from a safety system ECU detecting a front end collision. This same message that initiates execution of the target function 122 may also be the message needed to test the different unrelated software function (e.g., to test the triggering of an emergency 9-1-1 call). Thus, a person may desire to disable the target function 122 without replacing its functionality when the target function relies on the same data (e.g., a message output by another ECU function) as relied on by a different software function of interest to be executed (e.g., for testing). Similarly, a person may desire to disable the target function 122 without replacing its functionality when the target function 122 relies on data (e.g., a message) generated by a different software function to be executed as part of a testing procedure or under other circumstances.

The challenge with disabling (or preventing the execution of) the target function 122 in the illustrated example of FIG. 1 using existing technology is that many existing ECUs are designed as a unitary whole. That is, typically, the entire target ECU 104, and all of the functionality thereof, is either in operation or taken out of operation if implemented according to known ECUs. Thus, a common approach to preventing the operation of the target function 122 is to prevent the entire target ECU 104 from interfacing with the network 114 and/or otherwise disabling the target ECU 104. In some instances, this involves the physical detachment of the target ECU 104 from its harness within the vehicle. This approach is problematic because it also necessarily disables (prevents the execution of) the other functions 116, 118, 120. While it may be desirable to disable (i.e., prevent the execution of) the target function 122, it may be desirable, at the same time, to allow one or more of the other functions 116, 118, 120 to remain active and operational (i.e., continue to execute such functions). To resolve this problem, after removing the target ECU 104, people may generate software code to be executed on the computing device 126 to replace the functionality of the desired functions 116, 118, 120 that were taken out of service (e.g., disabled) along with the target function 122. Often, the replacement software code implemented on the computing device 126 may need to be executed in a manner that mimics the actual ECU 104 for addressing and messaging purposes so that there is no apparent difference in operation from the perspective of the other ECUs 106, 108, 110, 112 that may be interacting with the executing software. The need to physically modify the vehicle 102 (by removing the target ECU 104) and the development of software (to replace the desired functions 116, 118, 120) makes this a complex and time consuming approach to accomplish the objective of disabling or deactivating the target function 122.

By contrast, if the target ECU 104 is implemented in accordance with the teachings disclosed herein, the target function 122 may be selectively disabled while enabling the other functions 116, 118, 120 to continue to be executed. Thus, there is no need to remove the target ECU 104 or otherwise physically modify the vehicle 102. Further, there is no need to develop and execute code to replace all of the desired functions within the target ECU 104 because they can still be executed locally by the target ECU 104. In some examples, replacement code may be executed in an external device (e.g., external to the target ECU 104) to replace functionality previously provided by the target function 122. However, the development and execution of a replacement software function specific to the target function 122 will typically be much easier than developing code to replace every function in the target ECU 104 other than the target function 122 as is commonly practiced in industry.

In some examples, the ability to selectively disable or deactivate (i.e., prevent the execution of) individual functions within the target ECU 104 is accomplished by the API used to interface the functions executed on the different ECUs 104, 106, 108, 110, 112 and/or the computing device 126. That is, in some examples, where it is anticipated that particular functions and/or types of functions may need to be disabled and/or replaced by externally executed logic, the functions and/or types of functions may be designated for disablement within the architecture of the API. Additionally or alternatively, in some examples, the target ECU 104 may include a function manager (e.g., a particular software function at the security layer) that directs and/or controls the routing of messages and/or data to and from the other functions 116, 118, 120, 122 within the target ECU 104. For example, if the function manager in the target ECU 104 receives a command from an external device that the target function 122 is to be disabled and replaced by a replacement function executed on the external device, the function manager may route any messages or interface calls for the target function 122 to the replacement function on the external device.

Figure 2:
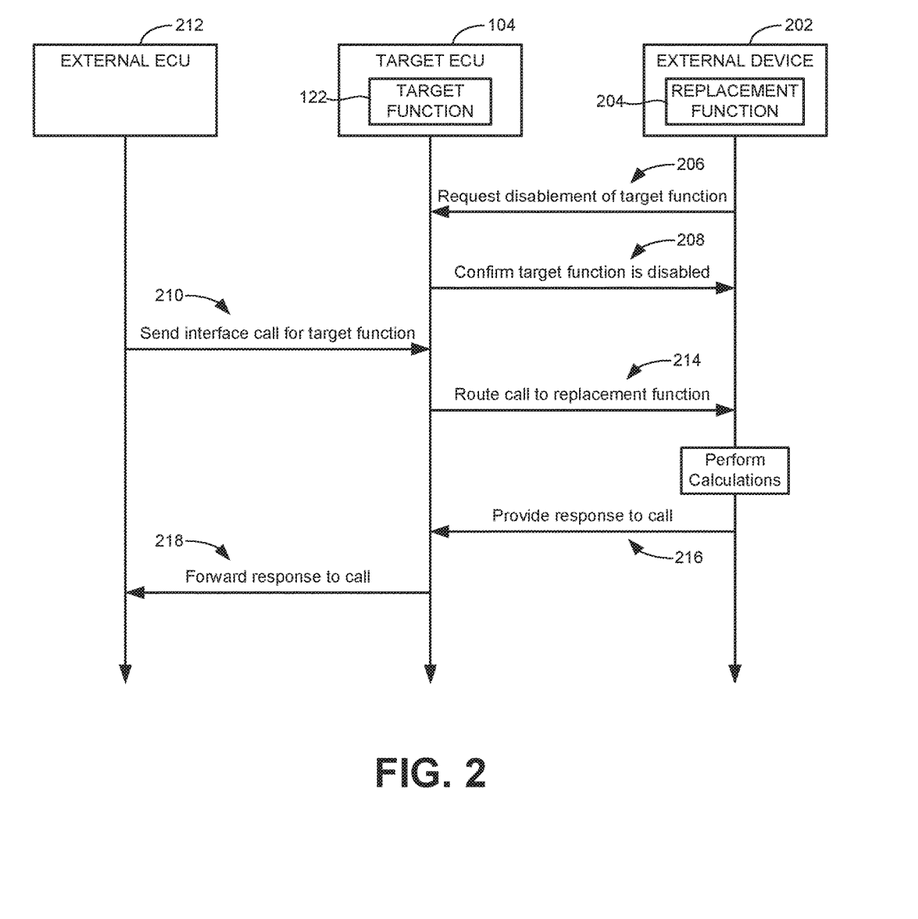
FIG. 2 illustrates the stages involved in disabling and rerouting of messages associated with the target function of FIG. 1.

The example stages involved in disabling and rerouting of messages associated with the target function 122 of FIG. 1 is illustrated in FIG. 2. The target ECU 104 is shown with the target function 122 initially being executed locally by the target ECU 104. In the illustrated example, an external device 202 includes a replacement function 204 intended to replace the functionality of the target function 122. As shown in FIG. 2, a first message 206 from the external device 202 to the target ECU 104 requests that the target function 122 be disabled (i.e., prevented from executing). In the illustrated example, the external device 202 may refer to any device external to the target ECU 104. Thus, the external device 202 may correspond to a separate ECU within the vehicle 102 or the computing device 126 external to the vehicle 102. In some examples, the request to disable the target function 122 (e.g., the first message 206) may include additional information indicating that the functionality of the target function 122 is to be replaced by the replacement function 204. If the request is proper and recognized, the target ECU 104 may send a second message 208 confirming that the target function 122 has been disabled. That is, the confirmation indicates that target ECU 104 is now configured to prevent the execution of the target function 122.

In the illustrated example, after the target function has been disabled, any message intended for the target function 122 is passed to the replacement function 204 executed on the external device 202. Thus, when a third message 210 including an interface call for the target function 122 is sent from an external ECU 212 (e.g., external to the target ECU 104), the target ECU generates a fourth message 214 routing the interface call to the replacement function 204 executing on the external device 202. After performing relevant calculations and/or otherwise processing the interface call, the replacement function 204 generates a response to the interface call that the external device 202 transmits in a fifth message 216 back to the target ECU 104. In some examples, the response to the interface call includes replacement data generated by the replacement function 204 that replaces data that would have been generated by the target function 122 if it were being executed rather than being disabled (e.g., blocked from execution). In the illustrated example, once the target ECU 104 receives the fifth message 216 (the response to the interface call) from the external device 202, the target ECU 104 may then send a sixth message 218 forwarding the response to the interface call to the external ECU 212. In the illustrated example, the external ECU 212 may correspond to any one of the ECUs 106, 108, 110, 112 in the vehicle 102 other than the target ECU 104.

In some examples, the response to the interface call may be different than as shown in FIG. 2. For example, in response to the interface call, the replacement function 204 may generate a message designated for a different ECU and/or implement any other suitable response. In other examples, the target function 122 may be disabled without being replaced. In such examples, any interface calls for the target function 122 such as the third message 210 in the illustrated example may be ignored by the target ECU 104 or otherwise rejected without further action.

Figure 3:
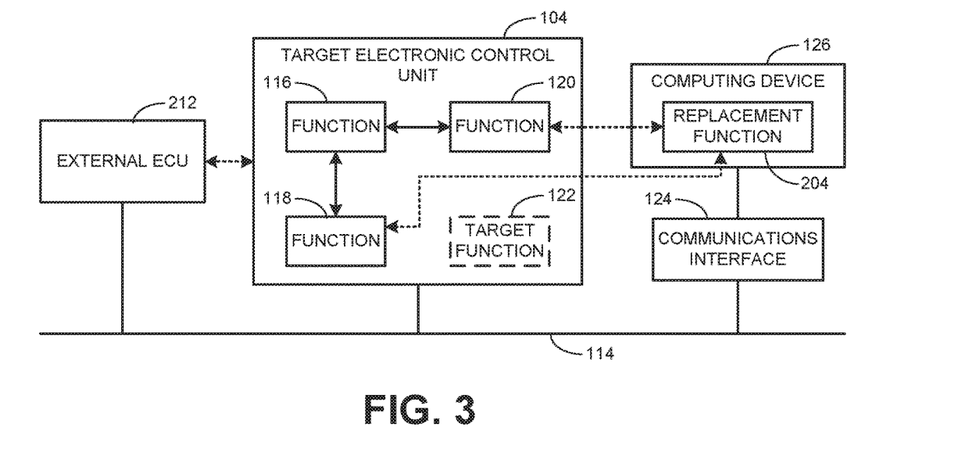
FIG. 3 illustrates the target function of FIGS. 1 and/or 2 being replaced by a replacement function executed on the example computing device of FIG. 1.
Figure 4:
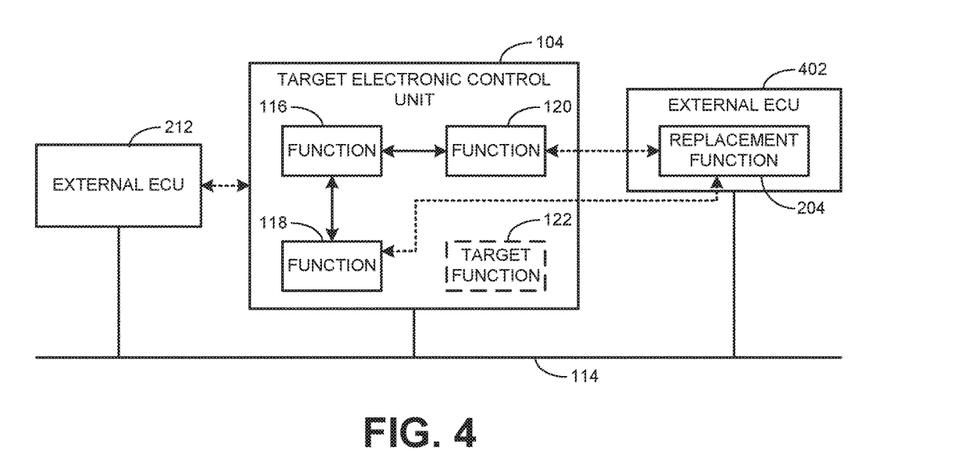
FIG. 4 illustrates the target function of FIGS. 1 and/or 2 being replaced by a replacement function executed on a different ECU in the vehicle in FIG. 1.

FIG. 3 illustrates the relationship of the functions 116, 118, 120, 122 of the target ECU 104 of FIG. 1 relative to each other and to other ECUs when the target function 122 is disabled and replaced by the replacement function 204 of FIG. 2 executed on the computing device 126 of FIG. 1. That is, in the illustrated example of FIG. 3, the computing device 126 of FIG. 1 corresponds to the external device 202 of FIG. 2. By contrast, FIG. 4 illustrates the relationship of the functions 116, 118, 120, 122 of the target ECU 104 of FIG. 1 relative to each other and to other ECUs when the target function 122 is disabled and replaced by the replacement function 204 executed on an external ECU 402 corresponding to one of the ECUs 106, 108, 110, 112 in the vehicle 102 other than the target ECU 104. That is, in the illustrated example of FIG. 4, the external ECU 402 corresponds to the external device 202 of FIG. 2, which may correspond to any one of the ECUs 106, 108, 110, 112 of FIG. 1.

In the illustrated examples of FIGS. 3 and 4, the target function 122 is represented in dashed lines to indicate the function is prevented from being executed (i.e., the function is disabled). Further, as shown in the illustrated examples, rather than the functions 118, 120 within the target ECU 104 interfacing with the target function 122 (as shown in FIG. 1), the functions 118, 120 are shown interfacing (represented by dashed arrows) with the replacement function 204. In FIG. 3, such interfacing is achieved by routing messages over the network 114 and communications interface 124. The interfacing between the functions 118, 120 with the replacement function 204 in FIG. 4 is similar to FIG. 3 except that the external ECU 402 is connected directly to the network 114 without the communications interface 124. While the functions 118, 120 of the target ECU 104 communicate with the replacement function 204 via the network 114 in FIGS. 3 and 4, the dashed arrows are shown connecting directly between the functions 118, 120 and the replacement function 204 to indicate that the replacement function 204 interfaces with the functions 118, 120 as if it was executed locally within the target ECU 104.

In some examples, this same relationship applies between the target ECU 104 and the other external ECU 212 (e.g., corresponding to another one of the ECUs 106, 108, 110, 112 of FIG. 1) shown in FIGS. 3 and 4. That is, in the illustrated example, the external ECU 212 interfaces with the replacement function 204 executed on either the computing device 126 (FIG. 3) or the other external ECU 402 (FIG. 4) as if the replacement function 204 was implemented within the target ECU 104. In other words, rather than transmitting an interface call directly to the replacement function 204, in some examples, the external ECU 212 may transmit a message directed to the target function 122 that is then passed to the replacement function 204. Any response to the interface call is provided by the replacement function back to the target ECU 104 and then routed to the external ECU 112 or any other intended location.

Figure 5:
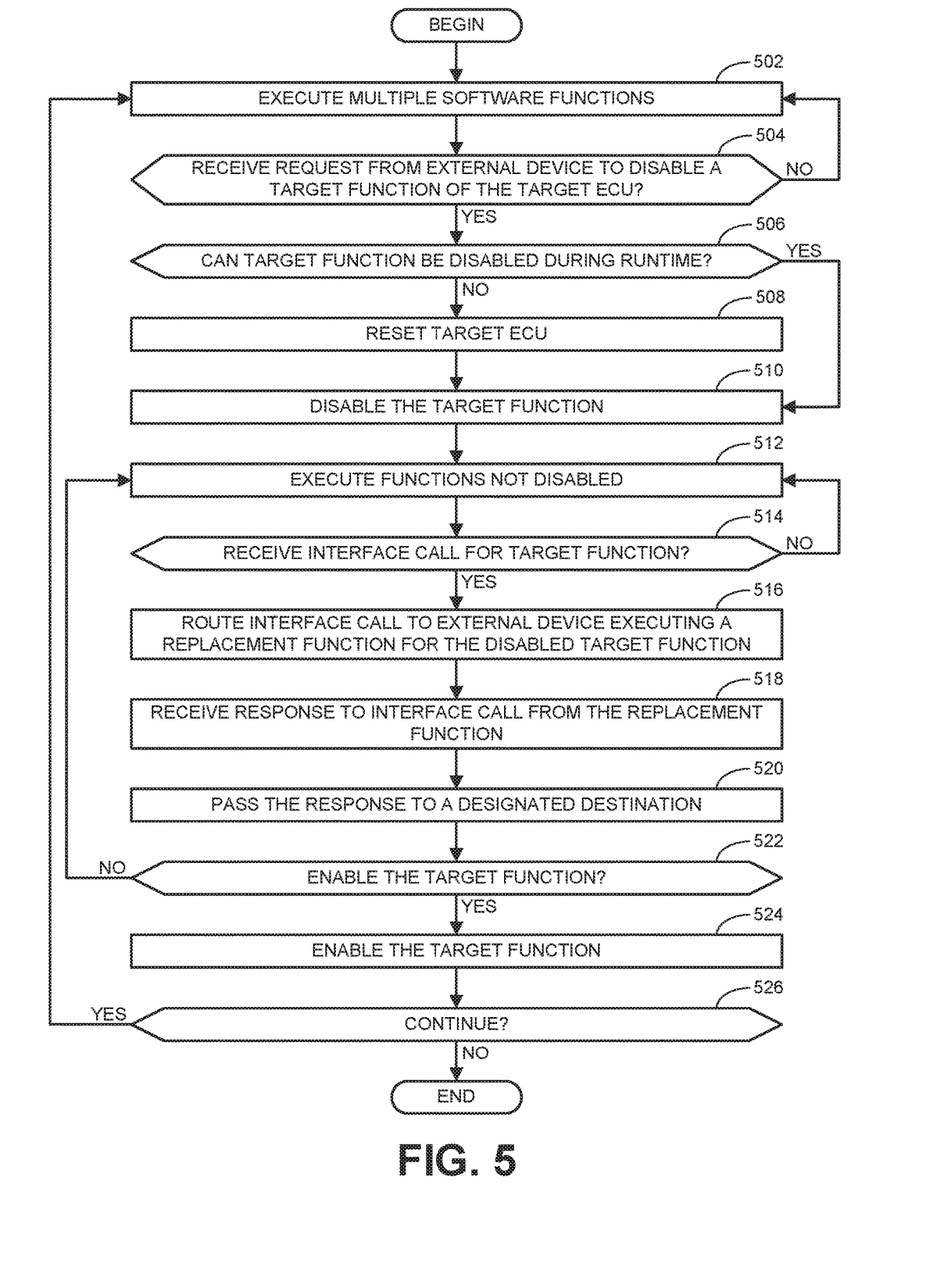
FIG. 5 is a flowchart illustrating an example method to implement the example target ECU of FIGS. 1-4.

A flowchart representative of an example method for implementing the target ECU of FIGS. 1-4 is shown in FIG. 5. In this example, the method may be implemented as machine readable instructions that comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example target ECU 104 may alternatively be used. For example, the order of execution of the blocks may be changed, and/or some of the blocks described may be changed, eliminated, or combined.

As mentioned above, the example method of FIG. 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Turning in detail to FIG. 5, the example method begins at block 502 where the target ECU 104 executes multiple software functions 116, 118, 120, 122. At block 504, the target ECU 104 determines whether a request from an external device to disable a target function 122 of the target ECU 104 has been received. If not, control returns to block 502. If a request to disable the target function 122 has been received, control advances to block 506 where the target ECU 104 determines whether the target function can be disabled during runtime. In some examples, disabling (i.e., preventing the execution of) certain software functions may not be accomplished during runtime because such changes may be identified as errors during a cyclic redundancy check (CRC), checksum, or other security check to verify the software logic has not been altered and/or is functioning as intended. In some examples, whether a particular software function of the target ECU 104 may be disabled during runtime depends on the nature of the functionality being disabled. If the target ECU 104 determines that the target function 122 cannot be disabled (i.e., cannot be stopped from executing) during runtime (block 506), control advances to block 508 where the target ECU 104 is reset. By resetting the target ECU 104, a security check may be based on new data values corresponding to when the target function 122 is disabled such that no error will be detected. Thus, at block 510, the target ECU 104 disables the target function 122. Returning to block 506, after resetting, if the target function 122 can be disabled during run time, control advances directly to block 510 to disable the target function 122.

At block 512, the target ECU 104 executes the functions 116, 118, 120 that have not been disabled. That is, the target function 122 is no longer executed because it is disabled but other functions of the target ECU 104 may continue to be executed. At block 514, the target ECU 104 determines whether an interface call for the target function 122 has been received. If not, control returns to block 412 to continue executing the other functions. If an interface call for the target function 122 has been received, control advances to block 516 where the target ECU 104 routes the interface call to an external device executing a replacement function for the disabled target function. At block 518, the target ECU 104 receives a response to the interface call from the replacement function. At block 520, the target ECU 104 passes the response to a designated destination. In some examples, the designated destination may be the source of the interface call (e.g., the ECU that sent the interface call). In other examples, the designated destination may be a different destination (e.g., a different ECU).

At block 522, the target ECU 104 determines whether to enable the target function 122. In some examples, the target ECU 104 may enable the target function 122 based on another message from the external device instructing the target function to be enabled. In some examples, the target ECU 104 may automatically enable the target function 122 a set amount of time after the function was disabled. In some examples, the set amount of time is specified in the initial request to disable the target function 122. In some examples, the target ECU 104 may automatically re-enable the target function 122 when the external device (that provided the initial request to disable the target function 122) is disconnected from the network 114. For example, the external device may be the computing device 126 of FIG. 1 that is only temporarily connected to the network 114 for testing and then subsequently disconnected. If the target ECU 104 determines that the target function is not to be enabled (block 522), control returns to block 512. Otherwise, control advances to block 524 where the target function 122 is enabled. At block 526, the target ECU 104 determines whether to continue. If so, control returns to block 502. If not, the example method of FIG. 5 ends.

Figure 6:
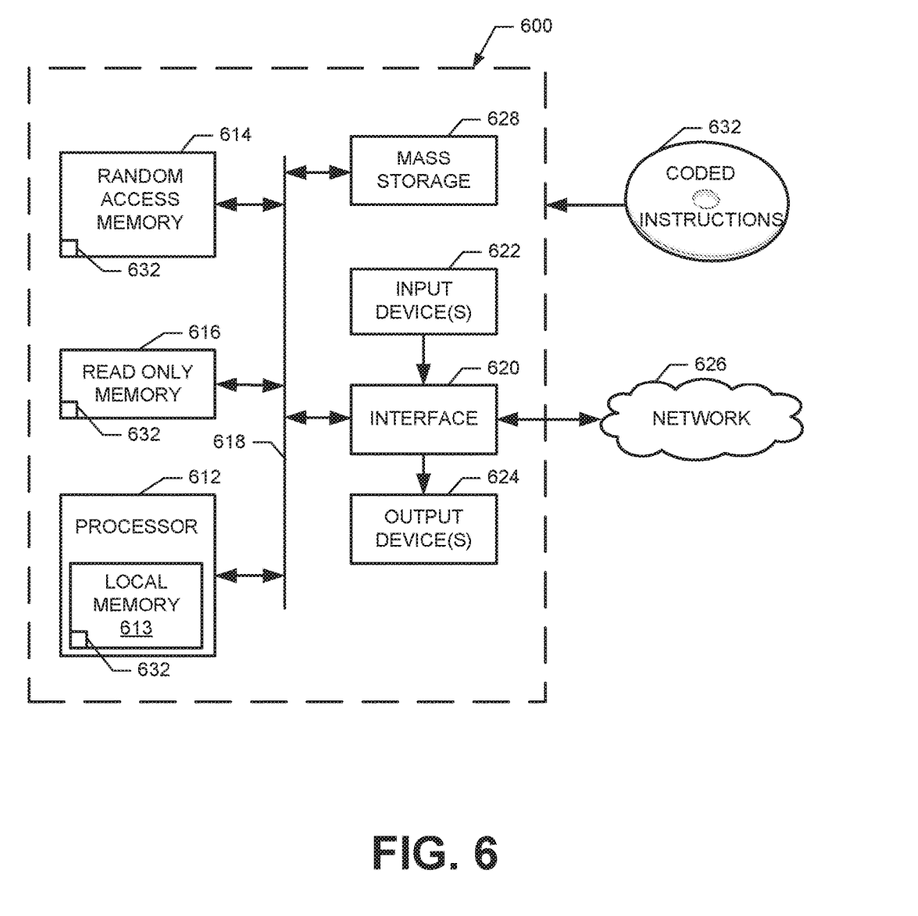
FIG. 6 is a block diagram of an example processor system structured to execute example machine readable instructions represented at least in part by the example method of FIG. 5 to implement the example target ECU of FIGS. 1-4.

FIG. 6 is a block diagram of an example processor platform 600 capable of executing instructions to implement the method of FIG. 5 and the target ECU 104 of FIGS. 1-4. The processor platform 600 can be, for example, a server, a personal computer, a mobile device (e.g., a cell phone, a smart phone, a tablet such as an iPad™), a personal digital assistant (PDA), or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

Coded instructions 632 of to implement the method of FIG. 5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods, apparatus and articles of manufacture enable the selective disablement and/or replacement of particular software functions within an ECU of a vehicle while continuing to execute other functions within the ECU. Furthermore, such deactivation or disablement is accomplished without the need to physically modify the vehicle. As a result, the disablement (i.e., the prevention of execution) of particular software functions may be performed on a temporary basis to reduce the cost and complexity of testing and/or developing new and/or modified software functions for the vehicle. Further, in some examples, particular functions may be disabled (prevented from execution) on a permanent basis if their functionality is no longer needed and/or no longer desired because, for example, different software is being implemented that serves the same purpose.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   executing, via a processor of an electronic control unit in a vehicle, a first software function and a second software function;
   receiving, at the electronic control unit via a controller network in the vehicle, a first message transmitted from an external device; and
   in response to the first message, preventing the execution of the first software function while continuing to execute the second software function, the preventing of the execution of the first software function accomplished without a physical modification to the vehicle, the external device to execute a replacement software function when the first software function is prevented from being executed, the replacement software function corresponding to the functionality of the electronic control unit provided by the first software function.

2. The method of claim 1, further including executing the second software function using first data generated by the first software function before receiving the first message when the first software function is executed, and executing the second software function using replacement data generated by the replacement software function after receiving the first message when the first software function is prevented from being executed.

3. The method of claim 1, further including:
   receiving a second message for the first software function from a different electronic control unit; and
   routing the second message to the external device, the external device to execute the replacement software function using data contained within the second message.

4. The method of claim 3, further including:
   receiving a response to the second message from the external device; and
   forwarding the response to the second message to a designated destination.

5. The method of claim 1, further including:
   receiving the first message during runtime of the electronic control unit; and
   preventing the execution of the first software function during the runtime.

6. The method of claim 1, further including preventing the execution of the first software function after the electronic control unit is reset.

7. The method of claim 1, wherein the external device is a different electronic control unit in the vehicle.

8. The method of claim 1, wherein the external device is communicatively coupled to the electronic control unit via at least one of an onboard diagnostic connector of the vehicle or a wireless communication interface.

9. An electronic control unit in a vehicle comprising:
   a processor; and
   a memory including instructions that, when executed, cause the processor to:
      execute a first software function of the electronic control unit of the vehicle;
      execute a second software function of the electronic control unit;
      receive, via a controller network in the vehicle, a first message transmitted from an external device; and
      in response to the first message, disable the first software function to prevent the execution of the first software function while continuing to execute the second software function, the disabling of the first software function accomplished independent of physical modifications to the vehicle, the external device execute a replacement software function when the first software function is prevented from being executed, the replacement software function corresponding to a functionality of the electronic control unit provided by the first software function.

10. The electronic control unit of claim 9, wherein the instructions further cause the processor to execute the second software function using first data generated by the first software function before receiving the first message when the first software function executed, and execute the second software function using replacement data generated by the replacement software function after receiving the first message when the first software function is disabled.

11. The electronic control unit of claim 9, wherein the instructions further cause the processor to:
   receive a second message for the first software function from a different electronic control unit; and
   route the second message to the external device, the external device to execute the replacement software function using data contained within the second message.

12. The electronic control unit of claim 11, wherein the instructions further cause the processor to:
   receive a response to the second message from the external device; and forward the response to the second message to a designated destination.

13. A tangible computer readable storage medium comprising instructions that, when executed, cause a machine to at least:
execute a first software function of an electronic control unit in a vehicle;
execute a second software function of the electronic control unit;
receive, via a controller network in the vehicle, a first message transmitted from an external device; and
in response to the first message, disable the first software function while continuing to execute the second software function, the disabling of the first software function accomplished without physical modification to the vehicle, the external device to execute a replacement software function when the first software function is prevented from being executed, the replacement software function corresponding to a functionality of the electronic control unit provided by the first software function.

14. The tangible computer readable storage medium of claim 13, wherein the instructions further cause the machine to:
receive a second message for the first software function from a different electronic control unit; and
route the second message to the external device, the external device to execute the replacement software function using data contained within the second message.

15. The tangible computer readable storage medium of claim 14, wherein the instructions further cause the machine to:
receive a response to the second message from the external device; and
forward the response to the second message to a designated destination.

16. The method of claim 1, wherein at least one of (1) execution of the first software function is triggered by a first output from a different electronic control unit in the vehicle or (2) execution of the first software function generates a second output that triggers the execution of a different software function in a different electronic control unit.

17. The electronic control unit of claim 9, wherein at least one of (1) execution of the first software function is triggered by a first output from a different electronic control unit in the vehicle or (2) execution of the first software function generates a second output that triggers the execution of a different software function in a different electronic control unit.

18. The tangible computer readable storage medium of claim 13, wherein at least one of (1) execution of the first software function is triggered by a first output from a different electronic control unit in the vehicle or (2) execution of the first software function generates a second output that triggers the execution of a different software function in a different electronic control unit.

* * * * *